US007289990B2

(12) United States Patent
Gupta

(10) Patent No.: US 7,289,990 B2
(45) Date of Patent: Oct. 30, 2007

(54) METHOD AND APPARATUS FOR REDUCING INDEX SIZES AND INCREASING PERFORMANCE OF NON-RELATIONAL DATABASES

(75) Inventor: Sanjay Gupta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 10/606,496

(22) Filed: Jun. 26, 2003

(65) Prior Publication Data

US 2004/0267800 A1 Dec. 30, 2004

(51) Int. Cl.
*G06F 17/30* (2006.01)
(52) U.S. Cl. ............................... 707/7; 707/203
(58) Field of Classification Search ............. 707/1–10, 707/100–104.1, 200–205, 603
See application file for complete search history.

(56) References Cited

U.S. PATENT DOCUMENTS

| 5,423,022 A * | 6/1995 | Ackley ..................... 703/20 |
| 5,764,973 A | 6/1998 | Lunceford et al. ............. 707/1 |
| 5,778,358 A | 7/1998 | Blackman et al. ............. 707/3 |
| 5,778,379 A | 7/1998 | Blackman et al. ...... 707/103 R |
| 2001/0018684 A1* | 8/2001 | Mild et al. ..................... 707/1 |
| 2001/0047372 A1 | 11/2001 | Gorelik et al. ............. 715/514 |
| 2002/0013790 A1 | 1/2002 | Vandersluis ................. 715/514 |
| 2004/0117351 A1* | 6/2004 | Challapalli et al. ............ 707/2 |

FOREIGN PATENT DOCUMENTS

JP 9-114856 5/1997

OTHER PUBLICATIONS

Y. Kotidis and N. Roussopoulos. A case for dynamic view management. ACM TODS, 26(4):388-423, 2001.*
Bharat Bhasker, et al., "The Architecture of a Heterogenous Distributed Database Management System: The Distributed Access View Integrated Database (DAVID)", ACM 089791-472-1/92/0002/0173, 1992, pp. 173-180.

* cited by examiner

*Primary Examiner*—Mohammad Ali
(74) *Attorney, Agent, or Firm*—William E. Schiesser; Greenblum & Bernstein, P.L.C.

(57) ABSTRACT

A method for increasing performance of non-relational databases with reduction in view index sizes is provided. One or more user views are provided in addition to the master view having all hierarchical/categorized data. User views are created having a subset of this hierarchical/categorized data that significantly reduces index size and improves performance. The indexes of the user view are associated with the indexes of the master view. This method improves view caching by dividing view cache into partitions based on the types of view, each with different priorities and management techniques. The master view may have a higher priority and may be used by servers while the user view may have lower priorities and may be used by users and client applications. In this way, legacy non-relational databases may continue to be suitably maintained with acceptable performance and avoiding potential cost and risk of migrating to a relational database.

15 Claims, 6 Drawing Sheets

METHOD AND APPARATUS FOR REDUCING INDEX SIZES AND INCREASING PERFORMANCE OF NON-RELATIONAL DATABASES

BACKGROUND OF THE INVENTION

1. Field of the Invention

The present invention generally relates to database access control, and more specifically, representing and controlling views of data in non-relational databases to reduce index size and increase overall performance.

2. Background Description

Efficient access to data stored in a database can be problematic as the size of a single database index and/or accumulative size of all indexes in a database grows. For example, many non-relational databases (non-RDBMs) may provide the foundation and knowledge base of a wide range of business, organization or institution operations, but these databases may contain such vast amounts of data that access and performance is impaired. Typically, non-relational databases and associated content often are developed over long periods of time, and frequently, becomes a legacy resource that is familiar and dependable in nature. This development of resources includes a vast amount of information that may be critical to the business or organization. Also over periods of time, additional users or applications may be added that compete for access to the data within the databases causing more processing overhead on the data management system. Even with these problems, there is an aversion to replacing or altering working database platforms.

As the non-hierarchical database grows in size, performance typically suffers and access times to the database grows accordingly, sometimes exponentially. As a response, transitions to relational databases are often undertaken to alleviate these performance issues, but these attempts can be very expensive and risky. These transitions may also require new hardware and software platforms that are necessary in supporting the new database architectures. As a result, loss of integrity and confidence in the database contents might develop as well as significant funding and training issues.

A non-relational database structure may be used for both hierarchical data or categorized non-hierarchical data. Traditionally, indexes to non-relational databases are stored in the databases themselves so that as the index size increases, the database size and access times to the database also increases. Conversely, it can be demonstrated that as the size of the view, consequently the size of the index and database is reduced, the database performance increases with regards to access time and processing speed.

Access to record content within the non-hierarchical databases is typically via an index mechanism. That is, all indexes are typically maintained as a view, often in memory or cache, for all records within the database. (A view includes a sorted and/or categorized list of documents and is the entry points into the data stored in the non-relational database). This indexing mechanism has disadvantages in that memory utilization and processing becomes excessive, particularly when many access requests are presented. In large non-RDBMs, the necessarily large view index size requires substantial overhead in terms of processing and memory management as data may not be normalized in the RDBMs. As the database increases in size, and hence the view indexes associated with the database, access performance issues compound. This is particularly an issue in client-server architectures where all requests flow through the server and the server must typically maintain view(s) of the entire database. The amount of bytes flowing over the network to clients is then generally related to the size of the maintained views.

If a legacy non-relational database can be preserved and its life extended by maintaining or improving performance of the non-RDBMs database, migrating to a relational database might be avoided or significantly postponed which may be much more attractive than incurring costs, risks, training factors, inconvenience, and the like, associated with migrating to a relational database.

SUMMARY OF THE INVENTION

In an aspect of the present invention, a method of accessing hierarchical data in a non-relational database is provided. The method includes the steps of creating a master view having a master index referencing the hierarchical data, creating a subordinate view of the master view having a subordinate index referencing a subset of said master index, where the subordinate view defines accessable data of the hierarchical data and the subordinate view index linked to a subset of the master view index and accessing the hierarchical data via the subordinate view.

In another aspect, a method is provided for enhancing performance when accessing hierarchical data in a non-relational database comprising the steps of creating at least one subordinate view having a subordinate index referencing a subset of said master index of the at least one master view and creating a temporary subordinate view index map associated with the at least one subordinate view when accessing the hierarchical data and accessing the at least a portion of hierarchical data by using the temporary subordinate view map wherein an amount of data accessed is less than using the master view.

In another aspect, an apparatus is provided for accessing hierarchical data in a non-relational database comprising a first component to create a master view having a master index referencing the hierarchical data and a second component to create a subordinate view of the master view that has a subordinate view index that references a subset of said master view index, the subordinate view defines accessible data of the hierarchical data and the subordinate view index linked to a subset of the master view index, and a third component to access the hierarchical data via the subordinate view.

In another aspect, a computer program product comprising a computer usable medium having readable program code embodied in the medium is provided. The computer program product includes a first computer program code to create a master view having a master index referencing the hierarchical data. A second computer program code to create a subordinate view having a subordinate index referencing a subset of said master index, where the subordinate view defines accessible data of the hierarchical data and the subordinate view index linked to a subset of the master view index, and a third computer program code to access the hierarchical data via the subordinate view.

BRIEF DESCRIPTION OF THE DRAWINGS

The foregoing will be better understood from the following detailed description of embodiments of the invention with reference to the drawings, in which.

DETAILED DESCRIPTION OF EMBODIMENTS OF THE INVENTION

Figure 1:
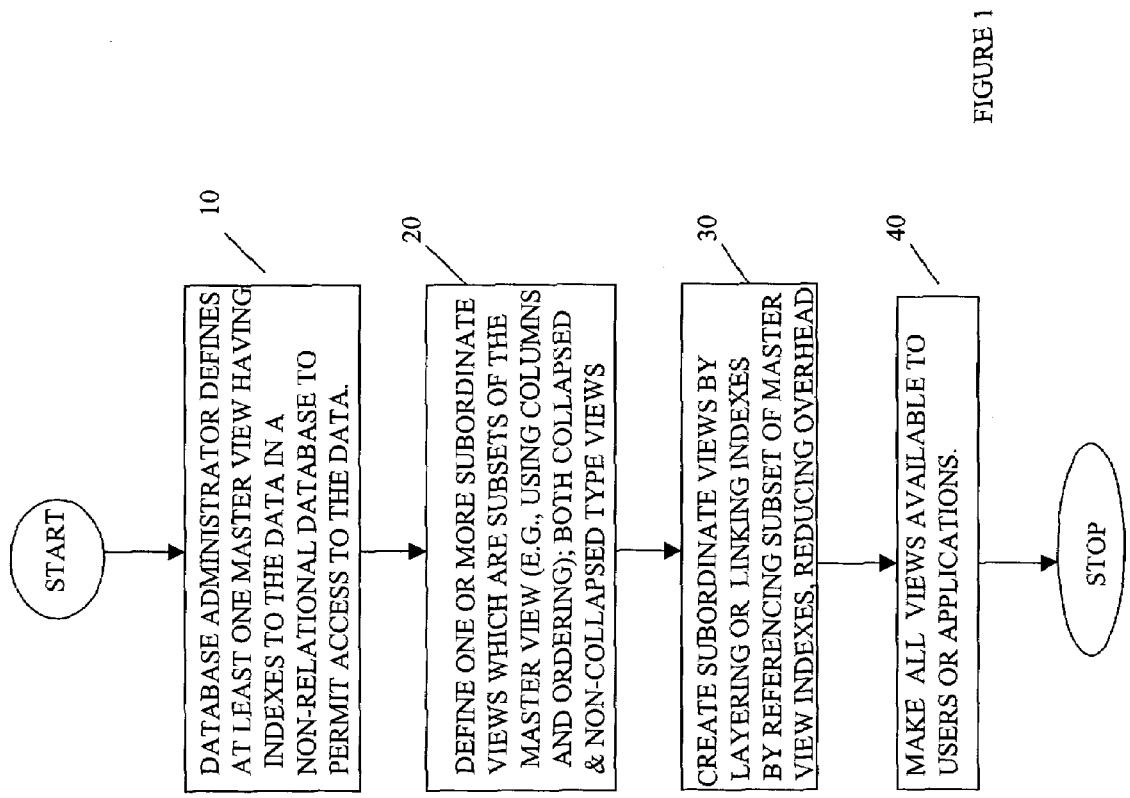
FIG. 1 is a flow diagram showing an overall method for generally providing master views and subordinate views according to the present invention.

The present invention is directed to a method and apparatus to substantially enhance access to data stored in non-relational databases (non-RDBMs). Specifically, the method and apparatus of the present invention is designed to increase efficiencies in processing time, bandwidth, or memory management of non-RDBMs. By implementing the method and apparatus of the present invention, a typical non-relational database may now contain vast amounts of data that may be made available to various applications or users on-demand and have the same data displayed in different ways in multiple views. A view is used to present data in a particular format and maintains the associated indexes required to perform the presentation.

An exemplary representation of a non-RDBMs structure and content of the present invention is shown in Table 1 below. This representation is only one embodiment of which many different variations of database content and structural organization may exist and be suitably managed by the present invention. The term "index" herein after may be singular or plural.

TABLE 1

Master View (1 of N)

| MASTER INDEX | | BOM Id (Sorted/ | Company (Sorted/ | | | | |
|---|---|---|---|---|---|---|---|
| Index | Index | Categorized) | Categorized) | Part No. | Part Desc. | Qty. | Price |
| 1 | 1 | 10001 | Celestica | 001 | Capacitor | 100 | 0.50 |
|  | 2 | 10001 | Celestica | 002 | Resistor | 400 | 0.10 |
|  | 3 | 10001 | Celestica | 003 | Resistor | 200 | 0.15 |
|  | 4 | 10001 | Celestica | 004 | Diode | 200 | 0.20 |
| 2 | 5 | 10002 | Flextronics | 005 | Memory | 50 | 1.50 |
| 3 | 6 | 10003 | Motorola | 006 | Switch | 10 | 1.60 |
| 1 | 2 | 3 | 4 | 5 | 6 | 7 | 8 |

Table 1 shows a master view having hierarchical data or categorized non-hierarchical data in accordance with the present invention. Hierarchical data implies a parent-child relationship between data. Categorized data implies that data can be grouped under categories. The term "data", used herein, may include hierarchical data, categorized hierarchical data, and alternatively, categorized non-hierarchical data. A master view typically includes all or most of the data within a database, however, more than one master view may exist for the same database. Table 1 is a very simple example of the contents of a master view where a master view typically provides indexes into very large amounts of data. The exemplary master view of Table 1 provides two different master indexes on the same data. By way of example, column 1 provides indexes 1, 2 and 3 using BOM ID category, and are associated with the BOM ID 10001, 10002 and 10003 respectively. This may also be referred to herein as "index on column 3." Column 2 provides indexes (1-6) using BOM ID and PART NUMBER also known hereinafter as "index on column 3 and 5." Together, column 1 and column 2 form a master index. Various other data fields may also be depicted including, for example, COMPANY, PART DESCRIPTION, QUANTITY, AND PRICE. Each of these fields may themselves provide for further ordering, as appropriate, and may have associated indexes as necessary.

The master view of Table 1 is, in an embodiment, organized and indexed by a database administrator (or equivalent) by defining the sorted/categorized column(s) with hierarchical/nonhierarchical data. In client-server architectures, the master view is typically only accessible by the server on which it resides (i.e., no network traffic involved). The master view is indexed and typically cached. When a non-RDBMs has multiple master views, the administrator may specify different buffer pool sizes for the set of master views, which may scale response times accordingly.

In accordance with the present invention, as shown in Tables 2A-2D, a subordinate view is a definition of a portion or subset of the master view. A subordinated view index is an index that is layered on or associated with the master view index for the data portions defined by the subordinate view. The master view and subordinate view may be established such that both of them present data in an identical format, but the indexing, and associated indexing tasks and parameters, may be different. As an example, master view indexes may have higher priority to cache than the subordinate view indexes. Furthermore, at a more granular level, different master view indexes may be assigned different priorities and the same may be done with subordinate views. This creates a grading of performance by view. Another example of indexing parameter may be to assign smaller chunks of memory to cache indexes, since this technique helps reduce overall index sizes of all the indexes in the database which makes more memory available for other database tasks, improving the performance of those tasks.

Access using a subordinate view is made similarly as a typical database access is made. According to the present invention subordinate views may also include collapsed versions wherein only a portion of the data of a subordinate view is returned in response to a request, or a non-collapsed version wherein all the data associated with an subordinate view is returned in response to a request. The desired version may be specified by the user or application during a database access request.

One or more subordinate views (alternatively referred to as user views) may be defined that are subsets of the master view with varying definitions as required by users or applications. By this mechanism, specific views for users (or applications) can be established for inquiries for specific subsets of data that usually involves much less data. This reduces the overall size of views and indexes in the database, itself, and requires less actual memory to hold the views. Further, the subordinate view mechanism of the present invention decreases the amount of actual bytes that must be transmitted in a reply to a request, memory, bandwidth overhead and associated response time Now referring to FIG. 1, an overall method for generally providing master views and subordinate views according to the present invention is shown beginning at step 10, a database administrator (or equivalent) defines at least one master view indexed to the data in a non-relational database to permit access to the data in the database typically organized by rows and columns. At step 20, the administrator defines one or more subordinate views, which access all or subsets of the data in the master view, using all or some the columns of the master view, and establish any new sort ordering for some of the columns of the subview. The subordinate views may be defined as either completely collapsed, partially collapsed or non-collapsed. At step 30, subordinate views are created by layering or linking indexes by referencing a subset of the master view indexes thereby reducing the overhead involved in processing, storing, managing and manipulating the data defined by the subordinate view.

Subordinate views' linkages (index) may be created by the database administrator (or equivalent) as necessary or may be created automatically based on intelligence collected by the server over a period of time. If the administrator selects automatic management of the master-subordinate view association, then the administrator may also define the period of time to be used by the server to establish and retain certain view linkages. The administrator may also have more flexibility to adjust view buffer sizes since smaller views require less memory. The net result, overall, may be less memory actually used or providing more opportunity to define more views. The administrator may also cache certain views and maps or even provide priorities to certain groups of views over other groups of views thereby establishing performance grading criteria for one view over another (e.g., one view may have faster response over another).

When the server manages views automatically, the server may keep a history by tracking the number of times requests for a view (e.g., using the temporary maps) occur. If the number of requests achieves a predetermined threshold (e.g., threshold established by the administrator) over a predetermined period of time, the server may decide to reuse the temporary map by caching such map. Conversely, temporary maps may be discarded if the numbers of requests are low and/or the view is very large.

Tables 2A-2D illustrate various aspects of subordinate views based on the master view of Table 1. Table 2A shows an exemplary definition of subordinate view No. 1, based on the master view of Table 1.

TABLE 2A

Subordinate View No. 1
Mapping on the Basis of the Master View

| Index | Index Map | BOM Id | Part Number (Sorted) | Part Description | Qty | Price |
|---|---|---|---|---|---|---|
| 1 | 4 | 10001 | | | | |
| 2 | 1 | 10002 | | | | |
| 1 | 2 | 3 | 4 | 5 | 6 | 7 |

The association of the subordinate view to the master view includes creating an index and identifying which indexes and column or columns of the master view are to be used as the base. In this example, there are two aspects to the definition. The first aspect includes which columns to present on a collapsed view (often for initial accesses) and denoted by the non-shaded area of column 3. The second aspect is a non-collapsed view and is reflected by the additional shaded area of columns 4-7 and define which additional columns are associated overall with subordinate view No. 1 and can be accessed accordingly thereby providing all columns of data 3-7 (for illustrative contrast, the data of the shaded area is not shown in a collapsed view but only in associated non-collapsed views).

A requestor may request either a collapsed or non-collapsed view as appropriate. A collapsed view request typically results in even greater reduction in data processed as compared with a non-collapsed view request. In these examples, master view column 4 (i.e., COMPANY) is not included in the subordinate view No. 1 and No. 2, to demonstrate one manner of reducing indexing overhead. Data that is not essential to a subordinate view is not included in the subordinate view definition and hence manipulation of that data is avoided, reducing overhead. In very large databases with a very large master index, using one or more subordinate views, referencing subsets of master view index, greatly reduces overhead.

Continuing the example, column 1 of subordinate view No. 1 has two indexes 1 and 2 associated with BOM ID 10001 and 10002, respectively. Column 2 provides an index map linking the subordinate view to the master view "index on column 3 and 5". The index map defines the number of relevant rows in the master view index, e.g., subordinate view index 1 (column 1) has an index map value of 4. This indicates that the master index 1 (column 1) has four rows associated with it as shown in Table 1. Subordinate index 2 (column 1) indicates that master index 2 (of column 1) has only one row associated with it as shown in Table 1. This mechanism shows a reduction in the index size in accordance with the present invention. Other linkages may be possible, as necessary, for associating subordinate views with master views, this illustrates one possibility. According to Table 2A, a user or application request, using subordinate view No. 1, is typically provided only BOM ID information in an collapsed view request since this is the definition of collapsed subordinate view No. 1, according to this example. It should be understood, though by those of ordinary skill in the art that other columns could be presented in a collapsed view access as predefined by a view definition, but in this example, only the BOM ID is presented. A user may access the collapsed view or the non-collapsed view on demand as indicated in any database access request.

When the user or application decides more information for a particular BOM ID is needed, e.g., the part number for all parts in BOM ID 10001, a non-collapsed view request is made and then the temporary index map of Table 2B is created, according to the overall definition of subordinate view No. 1 (i.e., Table 2A) which includes in this example, PART NUMBER, PART DESCRIPTION, QUANTITY, and PRICE. This map may also be created on an initial access typically when a non-collapsed access is requested.

TABLE 2B

Subordinate View No. 1 On The Basis Of The Master View

| Index | Index Map | Temp. Index | BOM Id (Sorted) | Part number (Sorted) | Part Description | Quantity | Price |
|---|---|---|---|---|---|---|---|
| 1 | 4 | 1 | 10001 | 001 | Capacitor | 100 | 0.50 |
|   |   | 2 |       | 002 | Resistor  | 400 | 0.10 |
|   |   | 3 |       | 003 | Resistor  | 200 | 0.15 |
|   |   | 4 |       | 004 | Diode     | 200 | 0.20 |
| 2 | 1 | 5 | 10002 | 005 | Memory    | 50  | 1.50 |
| 1 | 2 | 3 | 4     | 5   | 6         | 7   | 8    |

The non-collapsed view could include any combination data of the master view in its definition, but in this example, the data according to Table 2B is supplied. The amount of data that must be processed in a non-collapsed view request is still less than if a master view request. A subsequent request may be issued, as necessary, to acquire any other information associated with the master view. In many instances, the subset of information contained within any subordinate view may satisfy the query. Additionally, alternate subordinate views may provide variations in data that may be accessed.

Table 2C shows an exemplary definition of subordinate view No. 2, based on the master view of Table 1. This subordinate view provides another perspective into a subset of the master view and still references the indexes of the master view in order to reduce index sizes.

returns all the data of subordinate view No. 2 (i.e., columns 3-7). By way of example, neither subordinate view No. 1 nor subordinate view No. 2 has included the master view index 3 and the data associated with it cannot be accessed via either subordinate view thus also minimizing overhead when accessing the subordinate views. One of ordinary skill in the art will recognize that other master view indexes may exist in embodiments but not included in certain subordinate views permitting great flexibility in reducing index sizes and overhead in general.

A subsequent request on PART DESCRIPTION, for example, may cause the temporary index to be created according to the non-collapsed subordinate view No. 2 definition of Table 2D (i.e., a non-collapsed version of Table 2C).

TABLE 2D

Subordinate View No. 2 On The Basis of the Master View

| Index | Index Map | Temp. Index | Bom Id (Sorted) | Part Description (Sorted) | Part Number | Quantity | Price (Sorted) |
|---|---|---|---|---|---|---|---|
| 1 | 4 | 1 | 10001 | Capacitor | 001 | 100 | 0.50 |
|   |   | 4 |       | Diode     | 004 | 200 | 0.20 |
|   |   | 2 |       | Resistor  | 002 | 400 | 0.10 |
|   |   | 3 |       | Resistor  | 003 | 200 | 0.15 |
| 2 | 1 | 5 | 10002 | Memory    | 005 | 50  | 1.50 |
| 1 | 2 | 3 | 4     | 5         | 6   | 7   | 8    |

TABLE 2C

Subordinate View No. 2 Mapping On The Basis Of The Master View

| Index | Index Map | BOM Id | Part Description (Sorted) | Part Number | Quantity | Price |
|---|---|---|---|---|---|---|
| 1 | 4 | 10001 |   |   |   |   |
| 2 | 1 | 10002 |   |   |   |   |
| 1 | 2 | 3     | 4 | 5 | 6 | 7 |

By way of explanation, column 1 of subordinate view No. 2 has indexes 1 and 2 associated with BOM ID 10001 and 10002, respectively, while column 2 provides an index map linking the subordinate view to the master view "index on column 3 and 6". Again any collapsed view request using view NO. 2 returns the BOM ID. A non-collapsed request In the example of 2D, this map is sorted on the PART DESCRIPTION (per column 5) and the sorted order is reflected in the order of the temporary index (column 3) per the definition of this view. Non-collapsed subordinate view No. 2 definition includes PART NUMBER, QUANTITY and PRICE field.

Now, in traditional large non-RDBMs, the necessarily large view index size requires substantial overhead in terms of processing and memory management. As the view indexes increase in size, and hence the database increases in size, access performance issues compound. In client-server architectures, these performance issues are even more pronounced, as the server has to provide substantially more data to the client to enable easier scrolling. For example, when a client is scrolling through a portion (i.e., a page) of the index stored locally in memory, scrolling becomes slow when scrolling past the end of the page since a new page must be read from the server. As now should be understood by those of ordinary skill in the art, the present invention, by creating subordinate views, allows for much less data having to be maintained in the client memory (and usually the server memory). This translates into minimizing or eliminating paging accesses from the server.

Additionally, the present invention provides for smaller views that are faster to process since less I/O typically occurs. So by reducing the typical view index size, the present invention improves client-server performance and also reduces the amount of data transferred over an interconnecting network. This also results in substantial reduction in hosting costs (e.g., server hard drive costs and server memory sizes and costs). The present invention also provides for efficient and fast document additions to the database. By way of example, when a new document is added to an existing database category, only the master view index needs to be refreshed. The subordinate view index may not have to be modified, or at the least a simple count change for an associated index.

Use of the Present Invention

As discussed, the present invention provides for improving access performance in non-RDBMs systems by reducing the amount of indexing required by establishing subordinate views that are subsets of an associated master view. The flow diagrams of FIGS. 1-4B are representative flow diagrams implementing the steps of the present invention. FIGS. 1-4B may equally represent a high-level block diagram of the present invention implementing the steps thereof. The steps of FIGS. 1-4B may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Figure 2:
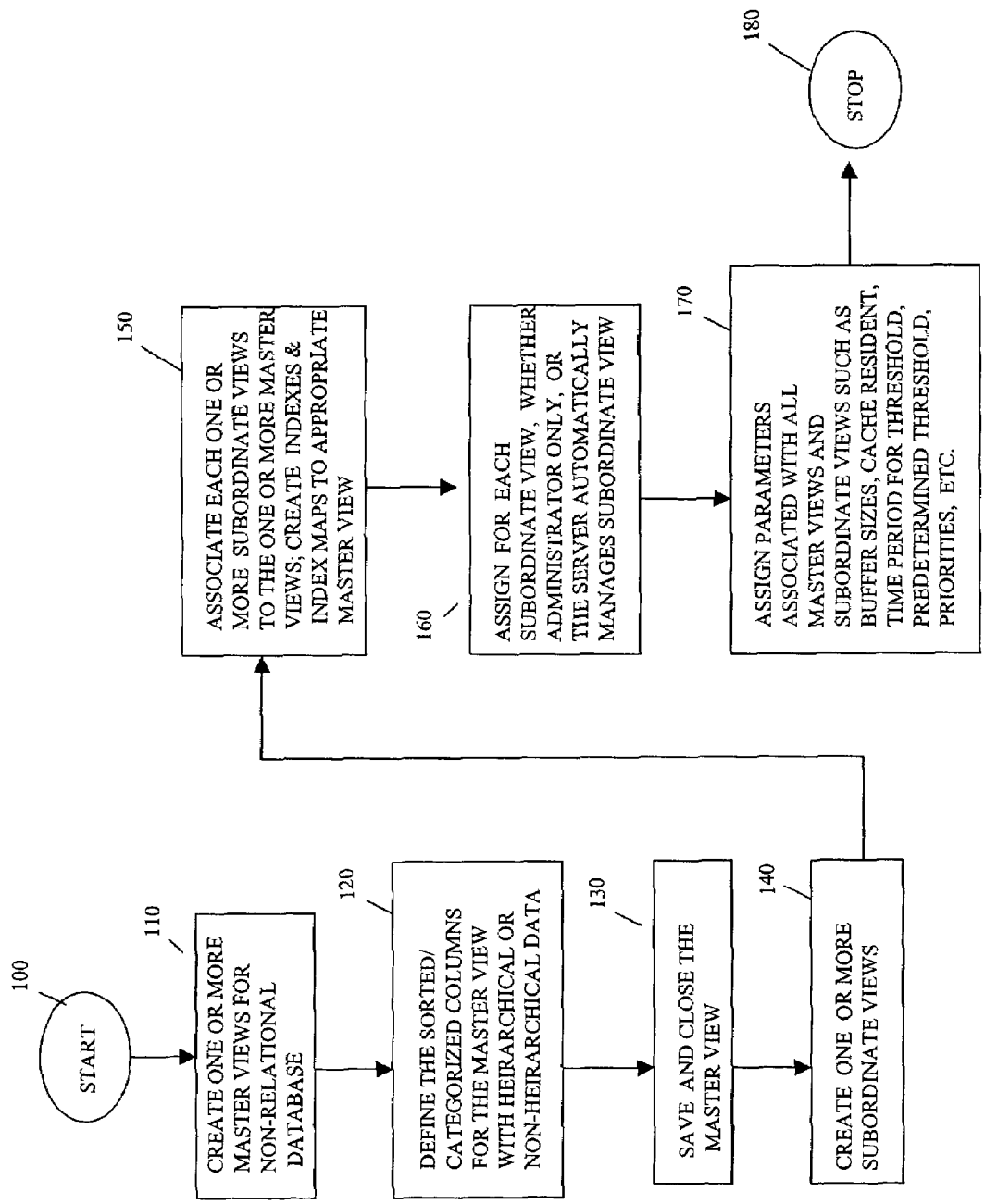
FIG. 2 is a flow diagram showing steps of creating master views and subordinate views in accordance with the present invention.

FIG. 2 is a flow diagram showing steps of creating master views and subordinate views starting at 100, according to the present invention. At step 110, one or more master views are created for a non-relational database. The master view typically indexes the entire non-RDBMs database but may involve only a portion thereof. At step 120, the master view is defined by the sorted or categorized columns with hierarchical or non-hierarchical data. The master view is closed and saved at step 130. At step 140, an administrator creates one or more subordinate views. At step 150, the one or more subordinate views are associated to a master view, or alternatively to more than one master view. Indexes are created for the subordinate view as necessary to define the subordinate view data content in relation to the master view and its indexes.

Alternatively, a server may automatically create subordinate views and be confirmed by the administrator. At step 160, for each subordinate view, an assignment is made as to whether a server may automatically manage a subordinate view (e.g., cause the subordinate view and temporary mapping to be cached). At step 170, parameters are assigned for all master views and subordinated views such as buffer sizes, cache resident or not, time period thresholds for determining whether a view is of high enough access frequency to be cached, predetermined time periods for framing decisions on whether to cache or not, etc. The sequence ends at step 180.

Figure 3A:
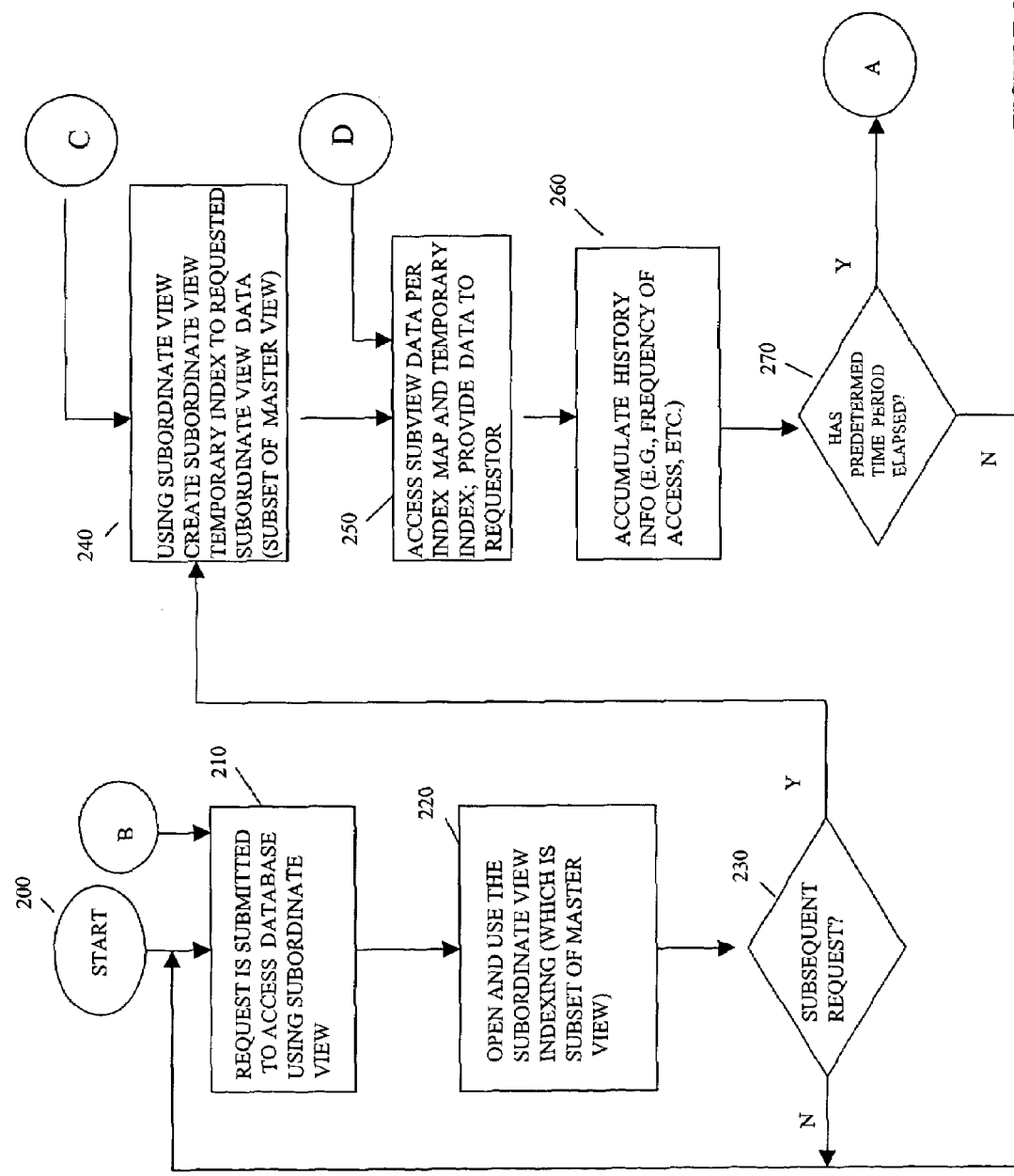
FIGS. 3A and 3B are flow diagrams showing steps of using master and subordinate views in accordance with the present invention.
Figure 3B:
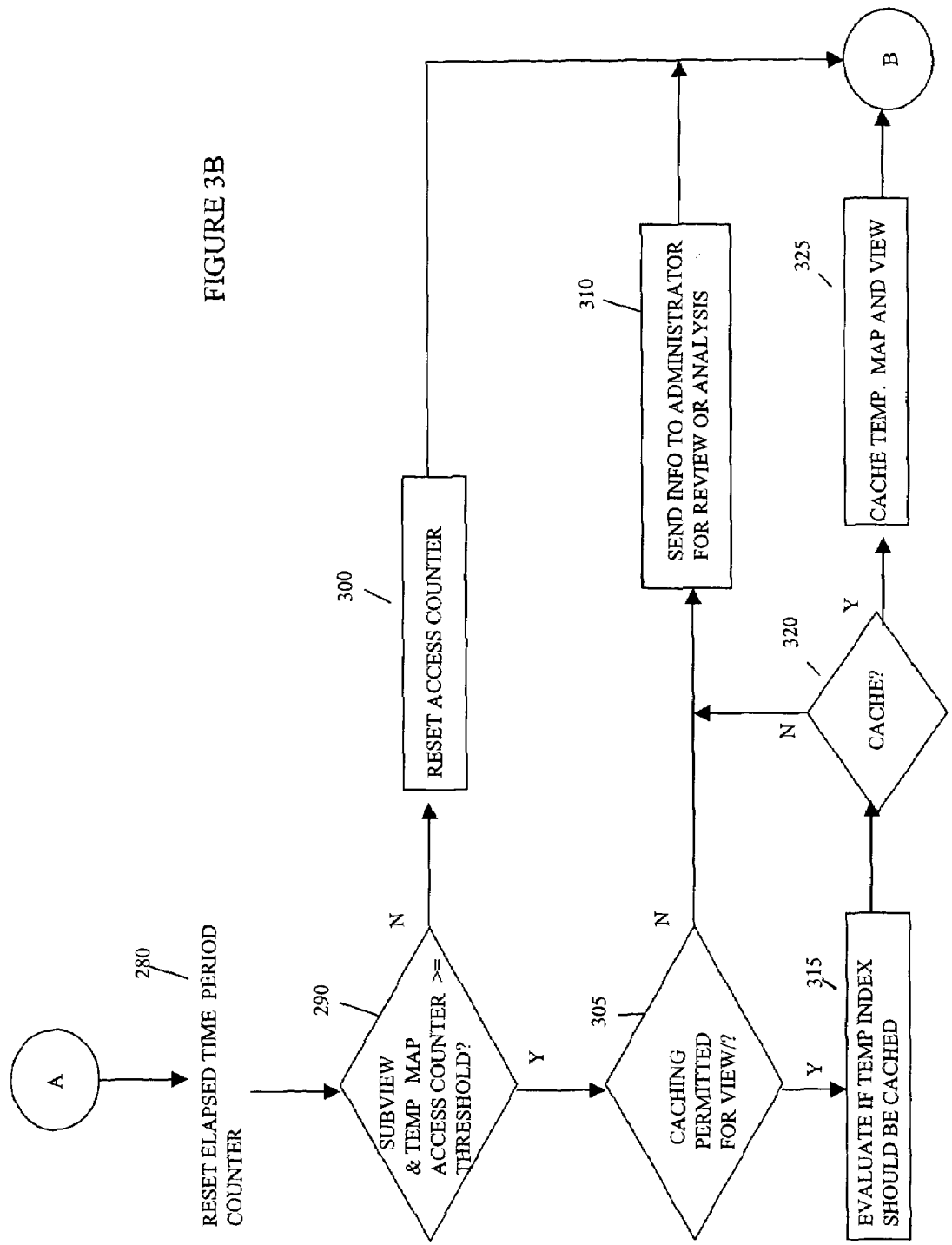

FIGS. 3A and 3B are flow diagrams showing aspects of using master and subordinate views starting at 200, with alternative entry into the flow diagram occurring at "C" and "D". At step 210, a request is submitted to access the database (e.g., as shown in illustrative Tables 1-2D) using a subordinate view. At step 220, the subordinate view is opened, if necessary, and the subordinate view indexing is used to access appropriate data elements associated with the defined subordinate view. A check is made at step 230 if a subsequent request is made to access additional data elements of the subordinate view. If there is no subsequent request, processing waits at step 210 for another request. If a subsequent request is available, then at step 240, using the subordinate view, a temporary map is created for the subset of the subordinate view data, the indexes for which are associated with the master view. Alternatively, a direct entry at "C" may occur for any access to the subordinate view such as, for example, a non-collapsed view access. At step 250, the subordinate view data is accessed and provided to the requestor. In client-server architectures this means delivering the data to the client. Typically the steps from 200 through 250 significantly minimize the amount of data, on average, that must be sent across a network connection (or the like) to the client. Alternatively, entry may begin at step 250 (denoted by entry point "D") for instances when a temporary map already exists when a request is made.

At step 260, history information is accumulated on the statistics associated with the subordinate view access, such as frequency of access per unit of time. At step 270, a check is made whether a predetermined time period has elapsed for determining the frequency threshold values. If the predetermined time period has expired, then at step 280, the elapsed time period counter is reset to begin another period interval. At step 290, a check is made if the access counter for the subordinate view and associated map has exceed predetermined threshold. If not, the access counter is reset at step 300 and processing continues with step 210.

However, if the access counter has reached a predetermined threshold, then an optional check may be made at step 305 to see if caching is permitted for the subordinate view. If caching is not permitted, then at step 310, the information is sent to an administrator for analysis or follow-up action, as necessary, then processing continues at step 210. Otherwise, at step 315, an evaluation is made to see if the temporary index needs to be cached. This may be performed, for example, by comparing the cumulative index map size and temporary index size to the master index size, average available memory, and processor power. A check is made at step 320 to see if the caching evaluation has determined whether to cache the temporary index. If the evaluation results do not meet automatic action requirements, the administrator is informed as an advisory at step 310. Otherwise, if the automatic requirements are met, then at step 325, all or portions of the subordinate view tables including temporary mapping are cached because high enough frequency of accesses has occurred during the predetermined period. Caching the subordinate view index map greatly improves overall performance. Processing continues with step 210.

Figure 4A:
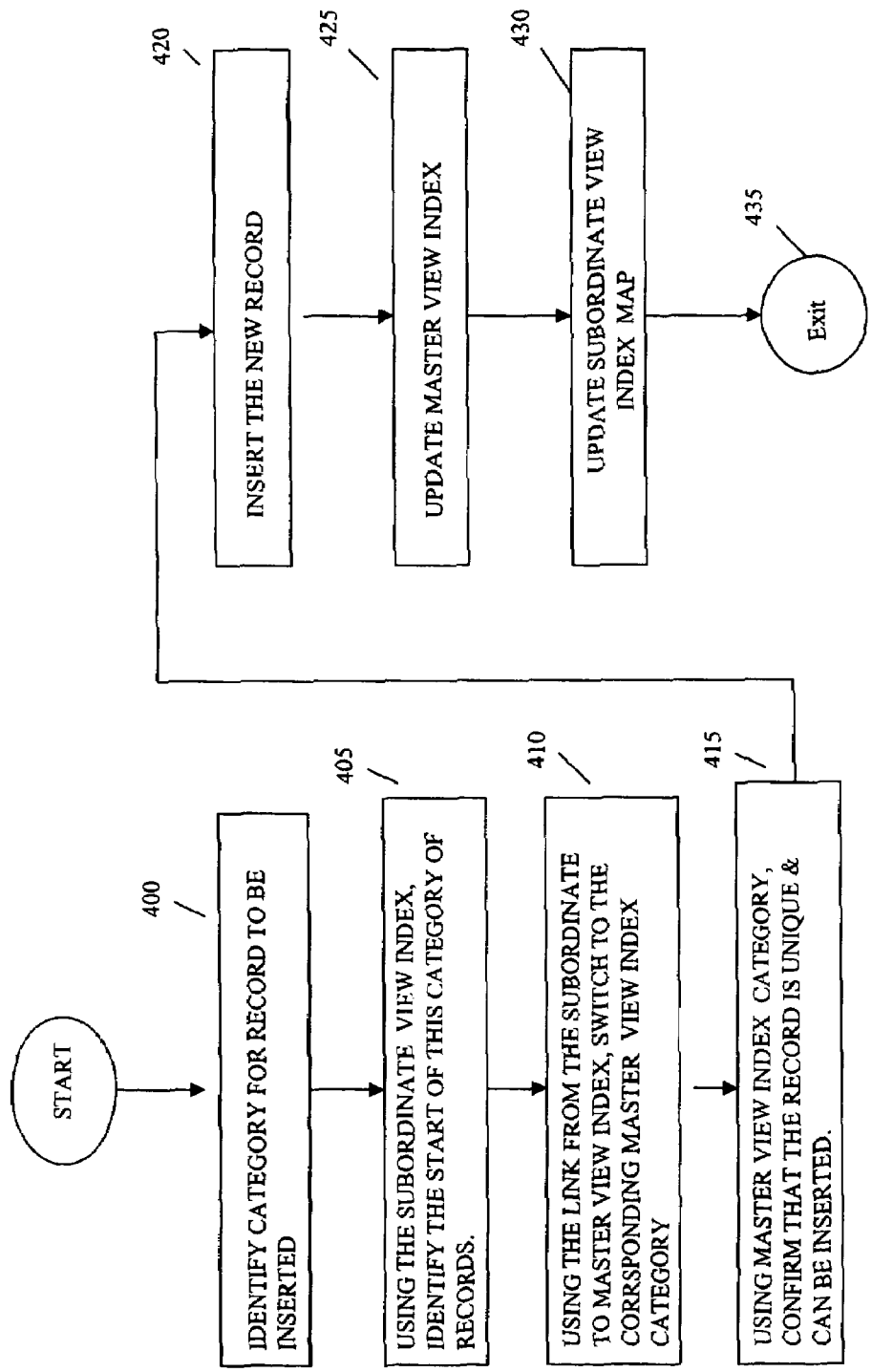
FIGS. 4A and 4B are flow diagrams showing the steps of embodiments of adding a new record and accessing a new record, respectively, according to the present invention.

FIG. 4A is a flow diagram showing the steps of an embodiment of adding a new record into the database in an existing category, according to the present invention. This is a faster way of adding new records. The process begins at step 400 where the category for the record to be inserted is identified. At step 405, using the subordinate view index, identify the start of this category of records. At step 410, using the link from the subordinate to master view index, switch to the corresponding master view index category. At step 415, using the master view index category, confirm that the record is unique and can be inserted. At step 420, the record is inserted. At step 425, the master view index is updated to reflect the new record. At step 430, the subordinate view(s) index map is also updated. The process exits at step 435.

Figure 4B:
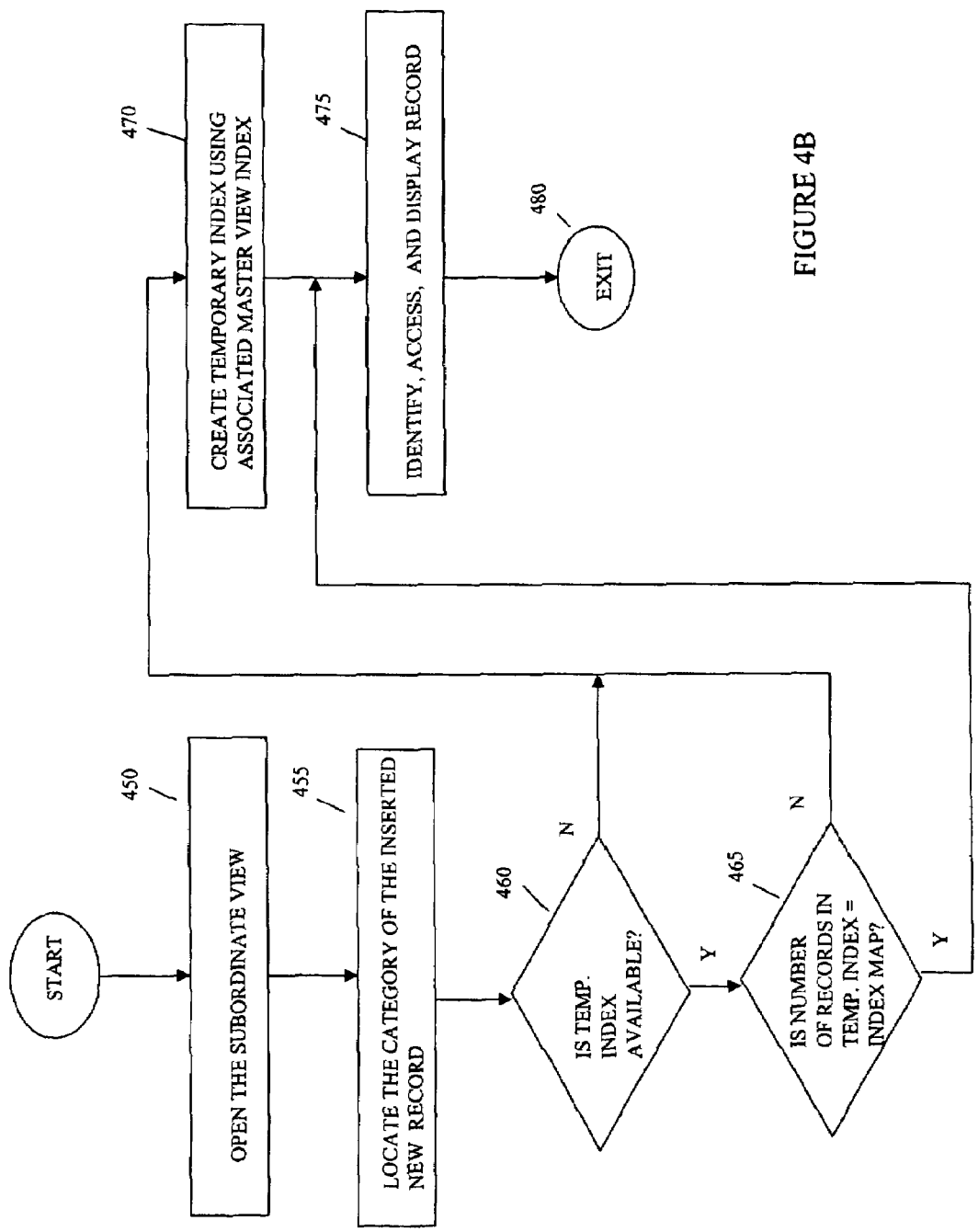

FIG. 4B is a flow diagram showing an embodiment of steps of accessing a newly inserted record beginning at step 450, wherein a subordinate view is opened. At step 455, the category of the inserted new record is located. At step 460, a check is made to see if a temporary index is available. If not available, continue with step 470. However, if available, then another check is made at step 465 to see if the number of records in the temporary index equals the index map. If not equal, then at step 470, a temporary index map is created using associated master view index. Processing continues then at step 475. If, however, at step 465 the number of records in the temporary index does not equal the index map, then at step 475, the requested record is identified, accessed, and displayed (i.e., returned to the requestor). The sequence exits at 480.

This method also provides the convenience that all views and indexes may not require updating when a new record is inserted in the database, i.e., updating the master view index and updating one specific value in the index map of the subordinate view rather than re-indexing the subordinate view which can be very expensive and time consuming.

While the invention has been described in terms of embodiments, those skilled in the art will recognize that the invention can be practiced with modifications and in the spirit and scope of the appended claims.

Having thus described our invention, what we claim as new and desire by Letters Patent is as follows:

1. A method of accessing data in a non-relational database, the method comprising the steps of:
    creating a master view having a master view index referencing the data;
    creating a subordinate view of the master view having a subordinate view index referencing a subset of said master view index, where the subordinate view defines accessible portions of the data and the subordinate view index is linked to a subset of the master view index;
    accessing the data via the subordinate view; and
    caching at least one of the subordinate view and the temporary index map, wherein the caching step includes:
        checking whether a predetermined time period has elapsed by checking an elapsed time period counter;
        if elapsed, checking whether access frequency exceeds a predetermined threshold by checking an access counter for the subordinate view;
        if the predetermined threshold is exceeded, checking whether the at least one of the subordinate view and the index map can be cached; and
        if so, then caching at least one of the subordinate view and the temporary index.

2. The method of claim 1, wherein the creating a master view includes defining at least one of sorted and categorized columns associated with the master view.

3. The method of claim 1, wherein the creating a subordinate view step includes defining at least one of a collapsed subordinate view and a non-collapsed subordinate view.

4. The method of claim 1, further comprising automatically managing the subordinate view.

5. The method of claim 1, wherein the accessing step includes creating an index map which links the accessible data associated with the subordinate view to the master index.

6. The method of claim 1, further comprising resetting one of the elapsed time period counter to start a new elapsed time period for counting access frequencies and the access counter for counting access frequencies to the temporary index map during the new elapsed time period.

7. The method of claim 1, further comprising maintaining historical information including access frequency to the subordinate view.

8. The method of claim 1, wherein the accessing step provides one of a reduction of data transferred to a client in a client-server architecture, a decrease in the amount of data manipulated during the accessing step, a decrease in response time to an access request, an increased performance, and a decrease in index size.

9. The method of claim 1, wherein the data includes at least one of categorized non-hierarchical data., hierarchical data, and categorized hierarchical data.

10. The method of claim 1, wherein the master view has a master index referencing at least a portion of the hierarchical data in the non-relational database.

11. The method of claim 1, wherein the creating a subordinate view step includes creating a plurality of subordinate views associated with one or more master views.

12. A method of enhancing performance when accessing hierarchical data in a non-relational database, the method comprising the steps of:
    creating at least one subordinate view having a subordinate index referencing a subset of a master index of at least one master view;
    creating a subordinate view index map associated with the at least one subordinate view when accessing the hierarchical data;
    accessing the at least a portion of hierarchical data by using the subordinate view index map;
    maintaining historical information including access frequency to the subordinate view; and
    caching at least one of the at least one subordinate view, the subordinate view index map and temporary index, wherein the caching step includes:
        checking whether a predetermined time period has elapsed by checking an elapsed time period counter; and
        if elapsed, checking whether the access frequency exceeds a predetermined threshold by checking a access counter for the at least one subordinate view;
        if the predetermined threshold is exceeded, checking whether the at least one subordinate view can be cached; and
        if so, caching at least one of the at least one subordinate view, the subordinate view index map, and the temporary index,
        wherein an amount of data accessed using the at least one subordinate view is less than the amount of data when accessing the at least one master view.

13. The method of claim 12, wherein the creating at least one subordinate view includes defining at least one of sorted and categorized columns associated with the at least one master view.

14. The method of claim 12, further including assigning priorities to one of the at least one master view and at least one subordinate view to grade performance.

15. The method of claim 12, wherein the subordinate view includes at least one of a collapsed view and a non-collapsed view and access via the collapsed view providing less data than access via a non-collapsed view.

* * * * *